United States Patent
Hayano

(10) Patent No.: US 10,253,137 B2
(45) Date of Patent: Apr. 9, 2019

(54) HYDROGENATED TETRACYCLODODECENE-BASED RING-OPENING POLYMER AND METHOD FOR PRODUCING SAME

(71) Applicant: ZEON CORPORATION, Tokyo (JP)

(72) Inventor: Shigetaka Hayano, Tokyo (JP)

(73) Assignee: ZEON CORPORATION, Tokyo (JP)

(*) Notice: Subject to any disclaimer, the term of this patent is extended or adjusted under 35 U.S.C. 154(b) by 0 days.

(21) Appl. No.: 15/125,777

(22) PCT Filed: Mar. 12, 2015

(86) PCT No.: PCT/JP2015/057263
§ 371 (c)(1),
(2) Date: Sep. 13, 2016

(87) PCT Pub. No.: WO2015/137434
PCT Pub. Date: Sep. 17, 2015

(65) Prior Publication Data
US 2017/0002133 A1    Jan. 5, 2017

(30) Foreign Application Priority Data

Mar. 14, 2014 (JP) ................ 2014-051621

(51) Int. Cl.
*C08G 61/08* (2006.01)
*C08G 61/02* (2006.01)
*C08F 32/00* (2006.01)
*C08F 32/08* (2006.01)
*C08F 8/04* (2006.01)

(52) U.S. Cl.
CPC ........... *C08G 61/02* (2013.01); *C08G 61/08* (2013.01); *C08F 8/04* (2013.01); *C08F 32/00* (2013.01); *C08F 32/08* (2013.01); *C08G 2261/12* (2013.01); *C08G 2261/212* (2013.01); *C08G 2261/228* (2013.01); *C08G 2261/3325* (2013.01); *C08G 2261/418* (2013.01); *C08G 2261/592* (2013.01); *C08G 2261/62* (2013.01); *C08G 2261/724* (2013.01)

(58) Field of Classification Search
CPC ....... C08F 32/00; C08F 32/08; C08F 132/00; C08F 132/08; C08F 232/00; C08F 232/08; C08F 8/04; C08G 61/02; C08G 61/08; C08G 2261/418; C08G 2261/724; C08G 2261/3325; C08G 2261/212
See application file for complete search history.

(56) References Cited

U.S. PATENT DOCUMENTS

| | | |
|---|---|---|
| 6,653,424 B1 | 11/2003 | Sakamoto et al. |
| 2007/0185290 A1 | 8/2007 | Hayano et al. |
| 2011/0060170 A1 | 3/2011 | Sugimoto et al. |

FOREIGN PATENT DOCUMENTS

| | | |
|---|---|---|
| EP | 2 194 569 A1 | 6/2010 |
| JP | 2002-249553 * | 9/2002 |
| JP | 2005-89744 A | 4/2005 |
| JP | 2006-52333 A | 2/2006 |
| JP | 2007-137935 A | 6/2007 |
| JP | 2008-13604 A | 1/2008 |
| JP | 2011-105625 A | 6/2011 |
| JP | 2013-139513 A | 7/2013 |
| JP | 2013-184925 * | 9/2013 |
| JP | 2013-184925 A | 9/2013 |
| WO | 01/14446 A1 | 3/2001 |
| WO | 02072659 A1 | 9/2002 |

OTHER PUBLICATIONS

JP 2013-184925, machine translation, Sep. 2013.*
Kim et al., Journal of Applied Polymer Science 116 (2009) 479-485.*
JP 2002-249553, machine translation; Sep. 2002.*
Hayano et al., Kobunshi Ronbunshu 68 (2011) 199-209.*
International Search Report dated Jun. 2, 2015, issued in counterpart international application No. PCT/JP2015/057263 (2 pages).
Translation of Written Opinion dated Jun. 2, 2015, issued in International Application No. PCT/JP2015/057263. (4 pages).
Extended European Search Report dated Sep. 13, 2017, issued in Application No. 15760910.8 (PCT/JP2015057263).
Database CA (online), Hayano et al., "Streoselective ring-opening matathesis polymerization by New Mo, W-based aatalysts-development of crystalline fydrogenated poly (endo-dicyclopentadiene)", Kobunsha Ronbun, 2011, vol. 68, No. 5, pp. 199-209, XP002773347, Database accession No. 2011:1101206.
Hayano et al., "Streoselective ring-opening matathesis polymerization by New Mo, W-based catalysts-development of crystalline fydrogenated poly (endo-dicyclopentadiene)", Koubunshi Ronbunshu, vol. 68, No. 5, 2011, pp. 199-209.

* cited by examiner

*Primary Examiner* — Roberto Rabago
(74) *Attorney, Agent, or Firm* — Westerman, Hattori, Daniels & Adrian, LLP

(57) ABSTRACT

The present invention is: a hydrogenated tetracyclododecene-based ring-opening polymer comprising a repeating unit (A) derived from tetracyclododecene in a ratio of 40 wt % or more based on a total amount of repeating units, a ratio of meso diads in the repeating unit (A) being 65% or more; and a method for producing the same. By means of the present invention, provided are: a crystalline hydrogenated tetracyclododecene-based ring-opening polymer having a high melting point and a high glass transition temperature, and exhibiting excellent heat resistance and excellent processability even after forming due to melt forming; and a method for producing the same.

6 Claims, No Drawings

HYDROGENATED TETRACYCLODODECENE-BASED RING-OPENING POLYMER AND METHOD FOR PRODUCING SAME

TECHNICAL FIELD

The present invention relates to a hydrogenated tetracyclododecene-based ring-opening polymer that has crystallinity even after being subjected to a thermal history due to melt forming or the like, and exhibits excellent heat resistance and excellent processability, and a method for producing the same.

BACKGROUND ART

A hydrogenated ring-opening polymer of dicyclopentadiene or the like is a cycloolefin polymer that exhibits excellent transparency, low birefringence, excellent formability (processability), and the like, and is used as a material that can be applied to various applications such as optical applications.

However, a hydrogenated ring-opening polymer of dicyclopentadiene or the like is normally obtained in the form of an amorphous polymer that has an atactic structure with random tacticity, and may exhibit insufficient heat resistance, mechanical strength, solvent resistance, and the like depending on the application.

In order to improve the performance of such a hydrogenated ring-opening polymer, it has been proposed to provide a hydrogenated ring-opening polymer of dicyclopentadiene or the like with crystallinity.

For example, Patent Literature 1 discloses that a ring-opening polymer having crystallinity is obtained by subjecting dicyclopentadiene to ring-opening polymerization using a polymerization catalyst that mainly includes a Group 6 transition metal compound (i.e., a compound that includes a transition metal that belongs to Group 6 in the periodic table) that is substituted with a specific substituent, and a hydrogenated ring-opening polymer having crystallinity is obtained by hydrogenating the carbon-carbon double bonds included in the ring-opening polymer using a hydrogenation catalyst. Patent Literature 2 discloses that a ring-opening polymer having syndiotacticity is obtained by subjecting dicyclopentadiene to ring-opening polymerization using a polymerization catalyst that mainly includes a Group 6 transition metal compound that includes an imido ligand, and a syndiotactic hydrogenated ring-opening polymer having crystallinity in which the ratio of racemo diads is 51% or more, is obtained by hydrogenating the carbon-carbon double bonds included in the ring-opening polymer using a hydrogenation catalyst.

The melting point of these crystalline hydrogenated dicyclopentadiene ring-opening polymers is 260 to 290° C. However, the glass transition temperature of a hydrogenated dicyclopentadiene ring-opening polymer is about 100° C. irrespective of whether the hydrogenated dicyclopentadiene ring-opening polymer is crystalline or amorphous. Therefore, when a crystalline hydrogenated dicyclopentadiene ring-opening polymer is heated to a temperature equal to or higher than 100° C., the amorphous domain of the resin undergoes thermal relaxation. Accordingly, a formed article produced using a crystalline hydrogenated dicyclopentadiene ring-opening polymer may change in mechanical strength or heat resistance at about 100° C., whereby an increase in coefficient of linear expansion may occur, or deflection may occur even under a low load, for example.

Patent Literature 3 discloses that a ring-opening polymer having syndiotacticity is obtained by subjecting tetracyclododecene to ring-opening polymerization using a specific ring-opening polymerization catalyst that mainly includes a Group 6 transition metal compound that includes an imido ligand, and an amorphous hydrogenated tetracyclododecene ring-opening polymer is obtained by hydrogenating the carbon-carbon double bonds included in the ring-opening polymer. Patent Literature 3 discloses that, when tungsten hexachloride is used as the polymerization catalyst, the resulting hydrogenated tetracyclododecene ring-opening polymer has a melting point (280° C.), but does not have a glass transition temperature (i.e., a semi-crystalline resin is obtained).

CITATION LIST

Patent Literature

Patent Literature 1: WO01/014446
Patent Literature 2: JP-A-2005-89744 (US2007/0185290A1)
Patent Literature 3: JP-A-2007-137935

SUMMARY OF INVENTION

Technical Problem

The inventor conducted studies with regard to the semi-crystalline hydrogenated tetracyclododecene ring-opening polymer disclosed in Patent Literature 3. When the resin was melted, and rapidly cooled (solidified) to form a resin formed article, a glass transition temperature and exotherm due to cold crystallization were observed when the thermal properties of the resulting resin were measured using a differential scanning calorimeter. When the resulting resin formed article was subjected to wide-angle X-ray diffraction analysis, only an amorphous halo was observed (i.e., a peak attributed to a crystal was not observed) (i.e., it was found that the crystallinity was lost). Specifically, when an atactic hydrogenated tetracyclododecene ring-opening polymer has been melted, crystallization does not occur even when the molten polymer is cooled to the room temperature due to a significant decrease in crystallization rate. Therefore, the resulting product exhibits poor heat resistance and processability, and has low industrial value as a material.

The invention was conceived in order to solve the above problems. An object of the invention is to provide a hydrogenated tetracyclododecene-based ring-opening polymer that has a high melting point and a high glass transition temperature, has crystallinity even after being subjected to a thermal history due to melt forming or the like, and exhibits excellent heat resistance and excellent processability, and a method for producing the same.

Solution to Problem

The inventor conducted extensive studies in order to solve the above problem. As a result, the inventor found that a hydrogenated tetracyclododecene-based ring-opening polymer that includes a repeating unit (A) derived from tetracyclododecene in a ratio of 40 wt % or more based on the total amount of repeating units, wherein the ratio of meso diads in the repeating unit (A) is 65% or more, has a high melting point and a high glass transition temperature, has crystallinity even after being subjected to a thermal history including rapid cooling due to melt forming or the like, and exhibits excellent heat resistance and excellent processability. The inventor also found that the melting point and the glass transition temperature of a hydrogenated tetracyclododecene-based ring-opening copolymer can be adjusted to the desired values while maintaining the mechanical strength up to the desired temperature, by appropriately selecting the weight ratio of a repeating unit derived from tetracyclododecene to a repeating unit derived from a monomer other than tetracyclododecene as long as the hydrogenated tetracyclododecene-based ring-opening copolymer has crystallinity. These findings have led to the completion of the invention.

According to one aspect of the invention, a hydrogenated tetracyclododecene-based ring-opening polymer includes a repeating unit (A) derived from tetracyclododecene in a ratio of 40 wt % or more based on the total amount of repeating units, the ratio of meso diads in the repeating unit (A) being 65% or more.

It is preferable that the hydrogenated tetracyclododecene-based ring-opening polymer include a repeating unit derived from dicyclopentadiene.

It is preferable that the hydrogenated tetracyclododecene-based ring-opening polymer include a repeating unit derived from norbornene.

It is preferable that the hydrogenated tetracyclododecene-based ring-opening polymer have a number average molecular weight (Mn) of 2,000 to 400,000.

It is preferable that the hydrogenated tetracyclododecene-based ring-opening polymer have a melting point of 300° C. or more.

It is preferable that the hydrogenated tetracyclododecene-based ring-opening polymer have a glass transition temperature of 130° C. or more.

According to another aspect of the invention, a method for producing the hydrogenated tetracyclododecene-based ring-opening polymer includes subjecting a tetracyclododecene-based monomer including tetracyclododecene in a ratio of 40 wt % or more based on the total amount of monomer to ring-opening polymerization using a compound represented by the following formula (1) or a compound represented by the following formula (2) as a polymerization catalyst to obtain a tetracyclododecene-based ring-opening polymer, and hydrogenating the main-chain carbon-carbon double bonds of the tetracyclododecene-based ring-opening polymer using hydrogen and a hydrogenation catalyst,

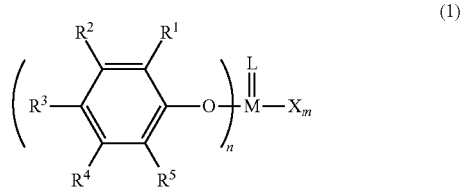

wherein M represents a transition metal atom that belongs to Group 6 in the periodic table, L represents an imido ligand that is unsubstituted, or substituted with an alkyl group having 1 to 12 carbon atoms or a substituted or unsubstituted aryl group having 6 to 12 carbon atoms, or an oxo ligand, each of $R^1$ to $R^5$ independently represents a hydrogen atom, an alkyl group having 1 to 12 carbon atoms, or a substituted or unsubstituted aryl group having 6 to 12 carbon atoms, provided that $R^1$ to $R^5$ are optionally bonded to each other to form a ring, X represents a halogen atom, n represents an integer from 1 to 4, and m represents (4-n),

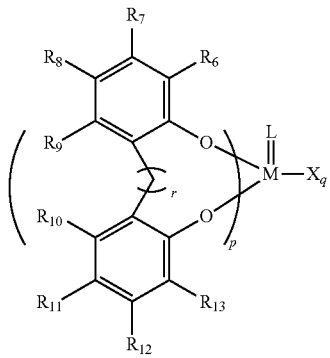

wherein M, L, and X are the same as defined above, each of $R^6$ to $R^{13}$ independently represents a hydrogen atom, an alkyl group having 1 to 12 carbon atoms, or a substituted or unsubstituted aryl group having 6 to 12 carbon atoms, provided that $R^6$ to $R^{13}$ are optionally bonded to each other to form a ring, p represents 1 or 2, q represents (4-2p), and r represents 0 or 1.

Advantageous Effects of Invention

The hydrogenated tetracyclododecene-based ring-opening polymer according to one aspect of the invention has a high melting point and a high glass transition temperature, has crystallinity even after being subjected to a thermal history including rapid cooling due to melt forming or the like, and exhibits excellent heat resistance and excellent processability.

Since the hydrogenated tetracyclododecene-based ring-opening polymer according to one aspect of the invention has an isotactic structure, and has a high crystallization rate, the hydrogenated tetracyclododecene-based ring-opening polymer may suitably be used as a forming material, a textile material, and a film-forming material used in various applications.

The hydrogenated tetracyclododecene-based ring-opening polymer according to one aspect of the invention can be designed to have the desired melting point and the desired glass transition temperature while maintaining the mechanical strength up to the desired temperature, by appropriately selecting the weight ratio of a repeating unit derived from tetracyclododecene to a repeating unit derived from a monomer other than tetracyclododecene.

The method according to one aspect of the invention can efficiently produce the hydrogenated tetracyclododecene-based ring-opening polymer according to one aspect of the invention.

DESCRIPTION OF EMBODIMENTS

A hydrogenated tetracyclododecene-based ring-opening polymer and a production method according to the exemplary embodiments of the invention are described in detail below.

1) Hydrogenated Tetracyclododecene-Based Ring-Opening Polymer

A hydrogenated tetracyclododecene-based ring-opening polymer according to one embodiment of the invention includes a repeating unit (A) derived from tetracyclododecene in a ratio of 40 wt % b or more (preferably 50 wt % or more, and more preferably 60 wt % or more) based on the total amount of repeating units, the ratio of meso diads in the repeating unit (A) being 65% or more.

The repeating unit (A) derived from tetracyclododecene is the repeating unit represented by the following formula (3). The repeating unit represented by the formula (3) is obtained by hydrogenating the main-chain carbon-carbon double bond included in a tetracyclododecene unit obtained by subjecting tetracyclododecene represented by the following formula (4) to ring-opening polymerization.

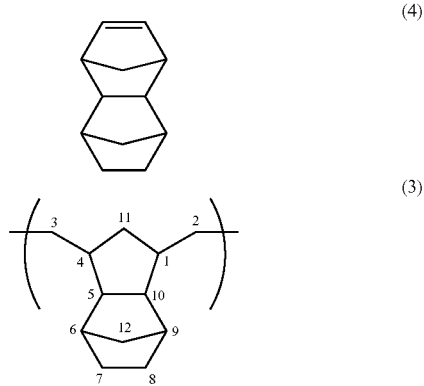

Examples of an additional repeating unit other than the repeating unit (A) derived from tetracyclododecene that may be included in the hydrogenated tetracyclododecene-based ring-opening polymer according to one embodiment of the invention, include a repeating unit derived from a monocyclic cycloalkene, a repeating unit derived from norbornene or a derivative thereof, a repeating unit derived from dicyclopentadiene or a derivative thereof a repeating unit derived from a tetracyclododecene derivative (excluding a repeating unit derived from tetracyclododecene), a repeating unit derived from hexacycloheptadecene or a derivative thereof, and the like. These additional repeating units other than the repeating unit (A) derived from tetracyclododecene are obtained by hydrogenating the main-chain carbon-carbon double bond included in a monomer unit obtained by subjecting an additional monomer that is copolymerizable with tetracyclododecene (through ring-opening polymerization) to ring-opening polymerization.

A repeating unit derived from dicyclopentadiene or a derivative thereof, and a repeating unit derived from norbornene or a derivative thereof, are preferable as the additional repeating unit, and a repeating unit derived from dicyclopentadiene and a repeating unit derived from norbornene are more preferable as the additional repeating unit.

When the hydrogenated tetracyclododecene-based ring-opening polymer according to one embodiment of the invention includes a repeating unit derived from dicyclopentadiene or a derivative thereof, it is preferable that the hydrogenated tetracyclododecene-based ring-opening polymer include a repeating unit derived from tetracyclododecene in a ratio of 50 wt % or more, and include a repeating unit derived from dicyclopentadiene or a derivative thereof in a ratio of 50 wt % or less. It is more preferable that the hydrogenated tetracyclododecene-based ring-opening polymer include a repeating unit derived from tetracyclododecene in a ratio of 55 wt % or more, and include a repeating unit derived from dicyclopentadiene or a derivative thereof in a ratio of 45 wt % or less. It is particularly preferable that the hydrogenated tetracyclododecene-based ring-opening polymer include a repeating unit derived from tetracyclododecene in a ratio of 60 wt % or more, and include a repeating unit derived from dicyclopentadiene or a derivative thereof in a ratio of 40 wt % or less. If the ratio of a repeating unit derived from tetracyclododecene is lower than the above range, and the ratio of a repeating unit derived from dicyclopentadiene or a derivative thereof is higher than the above range, it may be difficult to obtain a hydrogenated tetracyclododecene-based ring-opening polymer that has a high melting point and a high glass transition temperature.

When the hydrogenated tetracyclododecene-based ring-opening polymer according to one embodiment of the invention includes a repeating unit derived from norbornene or a derivative thereof, it is preferable that the hydrogenated tetracyclododecene-based ring-opening polymer include a repeating unit derived from tetracyclododecene in a ratio of 60 wt % or more, and include a repeating unit derived from norbornene or a derivative thereof in a ratio of 40 wt % or less. It is more preferable that the hydrogenated tetracyclododecene-based ring-opening polymer include a repeating unit derived from tetracyclododecene in a ratio of 65 wt % or more, and include a repeating unit derived from norbornene or a derivative thereof in a ratio of 35 wt % or less. It is particularly preferable that the hydrogenated tetracyclododecene-based ring-opening polymer include a repeating unit derived from tetracyclododecene in a ratio of 70 wt % or more, and include a repeating unit derived from norbornene or a derivative thereof in a ratio of 30 wt % or less. If the ratio of a repeating unit derived from tetracyclododecene is lower than the above range, and the ratio of a repeating unit derived from norbornene or a derivative thereof is higher than the above range, it may be difficult to obtain a hydrogenated tetracyclododecene-based ring-opening polymer that has a high melting point and a high glass transition temperature.

The hydrogenated tetracyclododecene-based ring-opening polymer according to one embodiment of the invention has a specific tacticity since the carbon atoms indicated by (1, 4) in the formula (3) are asymmetric carbon atoms.

The hydrogenated tetracyclododecene-based ring-opening polymer according to one embodiment of the invention is an isotactic polymer that has isotacticity, wherein the ratio of meso diads is 65% or more, preferably 67% or more, and more preferably 70% or more.

If the ratio of meso diads is less than 65%, the crystallinity of the hydrogenated tetracyclododecene-based ring-opening polymer may decrease to a large extent, and the characteristics (e.g., high melting point and processability) of the hydrogenated tetracyclododecene-based ring-opening polymer may be impaired.

The ratio of meso diads can be calculated by analyzing the $^{13}$C-NMR spectrum of the hydrogenated tetracyclododecene-based ring-opening polymer. Specifically, the ratio of meso diads can be determined by quantitatively determining the spectrum of the carbon atoms of the hydrogenated tetracyclododecene-based ring-opening polymer according to one embodiment of the invention that are indicated by (5, 10) in the formula (3). More specifically, the $^{13}$C-NMR spectrum of the carbon atoms indicated by (5, 10) included in the repeating unit represented by the formula (3) is measured at 210° C. using an o-dichlorobenzene-$d_4$/trichlorobenzene mixed solvent, and the ratio of meso diads to racemo diads is determined based on the intensity ratio of the signal at 51.40 ppm attributed to meso diads to the signal at 51.53 ppm attributed to racemo diads.

The number average molecular weight (Mn) of the hydrogenated tetracyclododecene-based ring-opening polymer according to one embodiment of the invention is 500 to 1,000,000, preferably 1,000 to 600,000, and more preferably 2,000 to 400,000. If the number average molecular weight (Mn) of the hydrogenated tetracyclododecene-based ring-opening polymer is too low, the hydrogenated tetracyclododecene-based ring-opening polymer may exhibit low mechanical strength. If the number average molecular weight (Mn) of the hydrogenated tetracyclododecene-based ring-opening polymer is too high, it may be difficult to form (mold) the hydrogenated tetracyclododecene-based ring-opening polymer. Note that the number average molecular weight (Mn) of the hydrogenated tetracyclododecene-based ring-opening polymer is almost equal to the number average molecular weight of the unhydrogenated tetracyclododecene-based ring-opening polymer.

The melting point of the hydrogenated tetracyclododecene-based ring-opening polymer according to one embodiment of the invention is preferably 300° C. or more, and more preferably 305° C. or more. If the melting point of the hydrogenated tetracyclododecene-based ring-opening polymer is less than 300° C., processability may deteriorate since the crystallinity of the resin is low. The upper limit of the melting point of the hydrogenated tetracyclododecene-based ring-opening polymer is not particularly limited, but may be about 360° C.

The glass transition temperature of the hydrogenated tetracyclododecene-based ring-opening polymer according to one embodiment of the invention is preferably 130° C. or more, and more preferably 135° C. or more. If the glass transition temperature of the hydrogenated tetracyclododecene-based ring-opening polymer is less than 130° C., the resin may exhibit low heat resistance. For example, the resin may have a low deflection temperature under load. The upper limit of the glass transition temperature of the hydrogenated tetracyclododecene-based ring-opening polymer is not particularly limited, but may be about 200° C.

The hydrogenated tetracyclododecene-based ring-opening polymer according to one embodiment of the invention may be produced by an arbitrary method. For example, the hydrogenated tetracyclododecene-based ring-opening polymer according to one embodiment of the invention may preferably be produced by the following production method according to one embodiment of the invention.

2) Production Method

A method for producing a hydrogenated tetracyclododecene-based ring-opening polymer according to one embodiment of the invention includes subjecting a tetracyclododecene-based monomer to ring-opening polymerization using the compound represented by the formula (1) (hereinafter may be referred to as "compound (1)") or the compound represented by the formula (2) (hereinafter may be referred to as "compound (2)") as a polymerization catalyst to obtain a tetracyclododecene-based ring-opening polymer (hereinafter referred to as "step (I)"), and hydrogenating the main-chain carbon-carbon double bonds of the tetracyclododecene-based ring-opening polymer using hydrogen and a hydrogenation catalyst (hereinafter referred to as "step (II)").

Step (I)

In the step (I), the tetracyclododecene-based monomer including tetracyclododecene in a ratio of 40 wt % or more (preferably 50 wt % or more, and more preferably 60 wt % or more) based on the total amount of monomer is subjected to ring-opening polymerization using the compound (1) or the compound (2) as a polymerization catalyst to obtain a tetracyclododecene-based ring-opening polymer.

It is known that tetracyclododecene that is used as the monomer includes an endo-anti stereoisomer, an endo-syn stereoisomer, an exo-anti stereoisomer, and an exo-syn stereoisomer. Tetracyclododecene normally includes an endo-anti stereoisomer and an exo-syn stereoisomer as the main components, and the content of an endo-syn stereoisomer and an exo-anti stereoisomer is equal to or less than the detection limit when determined by spectral analysis.

It is preferable that tetracyclododecene have high optical purity in order to achieve the object of the invention. It is particularly preferable that tetracyclododecene have a high endo-anti stereoisomer content. The endo-anti stereoisomer content is preferably 80% or more, and more preferably 90% or more. If the endo-anti stereoisomer content is less than 80%, the crystallinity of the hydrogenated tetracyclododecene-based ring-opening polymer may decrease to a large extent, and the characteristics (e.g., high melting point and high glass transition temperature) of the hydrogenated tetracyclododecene-based ring-opening polymer may be impaired.

A monomer other than tetracyclododecene that may be included in the tetracyclododecene-based monomer is not particularly limited as long as the object of the invention is not impaired. Examples of the monomer other than tetracyclododecene include a cycloalkene, dicyclopentadiene and a derivative thereof, norbornene and a derivative thereof a tetracyclododecene derivative, hexacycloheptadecene and a derivative thereof, and the like. Among these, dicyclopentadiene and a derivative thereof and norbornene and a derivative thereof are preferable, and dicyclopentadiene and norbornene are more preferable.

These monomers may be used either alone or in combination.

Examples of the cycloalkene include cyclopentene, cyclohexene, cycloheptane, and the like.

Examples of dicyclopentadiene and a derivative thereof include dicyclopentadiene, tricyclo[4.3.1$^{2,5}$.0]dec-3-ene (obtained by saturating the double bond of the 5-membered ring included in dicyclopentadiene), tricyclo[4.4.1$^{2,5}$.0]undec-3-ene, and the like.

Examples of norbornene and a derivative thereof include unsubstituted norbornene and a norbornene derivative that is substituted with an alkyl group, such as 5-methylnorbornene, 5-ethylnorbornene, 5-butylnorbornene, 5-hexylnorborene, 5-decylnorbornene, 5-cyclohexylnorbornene, and 5-cyclopentylnorbornene; a norbornene derivative that is substituted with an alkenyl group, such as 5-ethylidenenorbornane, 5-vinylnorbornene, 5-propenylnorbornene, 5-cyclohexenylnorbornene, and 5-cyclopentenylnorbornene; a norbornene derivative that is substituted with an aromatic ring, such as 5-phenylnorbornene;

a norbornene derivative that includes an oxygen atom-containing polar group, such as 5-methoxycarbonylnorbornene, 5-ethoxycarbonylnorbornene, 5-methyl-5-methoxycarbonylnorbornene, 5-methyl-5-ethoxycarbonylnobornene; norbornenyl-2-methyl propionate, norbornenyl-2-methyl octanoate, norbornene-5,6-dicarboxylic anhydride, 5-hydroxymethylnorbornene, 5,6-di(hydroxymethyl)norbornene, 5,5-di(hydroxymethyl)norbornene, 5-hydroxy-i-propylnorbornene, 5,6-dicarboxynorbornene, and 5-methoxycarbonyl-6-carboxynorbornene; a norbornene derivative that includes a nitrogen atom-containing polar group, such as 5-cyanonorbornene and norbornene-5,6-dicarboxylic acid imide; tetracyclo[6.5.1$^{2,5}$.0$^{1,6}$.0$^{8,13}$]trideca-3,8,10,12-tetraene (also referred to as 1,4-methano-1,4,4a,9a-tetrahydrofluorene);

tetracyclo[6.6.1$^{2,5}$.0$^{1,6}$.0$^{8,13}$-]tetradeca-3,8,10,12-tetraene (also referred to as 1,4-methano-1,4,4a,5,10,10a-hexahydroanthracene); and the like.

Examples of a tetracyclododecene derivative include a tetracyclododecene derivative that is substituted with an alkyl group, such as 8-methyltetracyclododecene, 8-ethyltetracyclododecene, 8-cyclohexyltetracyclododecene, and 8-cyclopentyltetracyclododecene; a tetracyclododecene derivative that includes a double bond outside the ring, such as 8-methylidynetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene;

a tetracyclododecene derivative that includes an aromatic ring, such as 8-phenyltetracyclododecene;

a tetracyclododecene derivative that is substituted with an oxygen atom-containing substituent, such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic anhydride;

a tetracyclododecene derivative that is substituted with a nitrogen atom-containing substituent, such as 8-cyanotetracyclododecene and tetracyclododecene-8,9-dicarboxylic acid imide; a tetracyclododecene derivative that is substituted with a halogen atom-containing substituent, such as 8-chlorotetracyclododecene; a tetracyclododecene derivative that is substituted with a silicon atom-containing substituent, such as 8-trimethoxysilyltetracyclododecene; and the like.

Examples of hexacycloheptadecene and a derivative thereof include unsubstituted hexacycloheptadecene and a hexacycloheptadecene derivative that is substituted with an alkyl group, such as 12-methylhexacycloheptadecene, 12-ethylhexacycloheptadecene, 12-cyclohexylhexacycloheptadecene, and 12-cyclopentylhexacycloheptadecene; a hexacycloheptadecene derivative that includes a double bond outside the ring, such as 12-methylidynehexacycloheptadecene, 12-ethylidenehexacycloheptadecene, 12-vinylhexacycloheptadecene, 12-propenylhexacycloheptadecene, 12-cyclohexenylhexacycloheptadecene, and 12-cyclopentenylhexacycloheptadecene; a hexacycloheptadecene derivative that is substituted with an aromatic ring, such as 12-phenylhexacycloheptadecene;

a hexacycloheptadecene derivative that is substituted with an oxygen atom-containing substituent, such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene-12,13-dicarboxylic acid, and hexacycloheptadecene-12,13-dicarboxylic anhydride;

a hexacycloheptadecene derivative that is substituted with a nitrogen atom-containing substituent, such as 12-cyanohexacycloheptadecene and hexacycloheptadecene-12,13-dicarboxylic acid imide;

a hexacycloheptadecene derivative that is substituted with a halogen atom-containing substituent, such as 12-chlorohexacycloheptadecene;

a hexacycloheptadecene derivative that is substituted with a silicon atom-containing substituent, such as 12-trimethoxysilylbhexacycloheptadecene; and the like.

When implementing the production method according to one embodiment of the invention, the compound (1) or the compound (2) is used as the polymerization catalyst.

In the formulas (1) and (2), M represents a transition metal atom that belongs to Group 6 in the periodic table. It is preferable that M be a tungsten atom or a molybdemn atom from the viewpoint of improving the activity of the polymerization catalyst.

L represents an imido ligand that is unsubstituted, or substituted with an alkyl group having 1 to 12 carbon atoms or a substituted or unsubstituted aryl group having 6 to 12 carbon atoms, or an oxo ligand.

The alkyl group having 1 to 12 carbon atoms that may substitute the imido ligand may be linear, branched, or cyclic. Specific examples of the alkyl group having 1 to 12 carbon atoms include a linear or branched alkyl group having 1 to 12 carbon atoms, such as a methyl group, an ethyl group, a propyl group, an isopropyl group, a butyl group, a t-butyl group, and a pentyl group, a cycloalkyl group having 3 to 12 carbon atoms, such as a cyclohexyl group and an adamantyl group; and the like.

Examples of the substituted or unsubstituted aryl group having 6 to 12 carbon atoms that may substitute the imido ligand include a phenyl group, and a monosubstituted to pentasubstituted phenyl group that is substituted with a substituent at at least one of positions 2, 3, 4, 5, and 6. A substituent that may substitute the aryl group is not particularly limited. Examples of the substituent include an alkyl group having 1 to 6 carbon atoms, such as a methyl group, an ethyl group, and an isopropyl group; an aryl group such as a phenyl group; a halogen atom such as a fluorine atom, a chlorine atom, and a bromine atom; an alkoxy group having 1 to 6 carbon atoms, such as a methoxy group and an ethoxy group; an amino group; an imino group; and the like.

Each of $R^1$ to $R^{13}$ independently represents a hydrogen atom, an alkyl group having 1 to 12 carbon atoms, or a substituted or unsubstituted aryl group having 6 to 12 carbon atoms.

Examples of the alkyl group having 1 to 12 carbon atoms and the substituted or unsubstituted aryl group having 6 to 12 carbon atoms include those mentioned above in connection with the imido ligand.

$R^1$ to $R^5$ and $R^6$ to $R^{13}$ are optionally bonded to each other to form a ring.

X represents a halogen atom such as a fluorine atom, a chlorine atom, a bromine atom, or an iodine atom. When a plurality of X are present, the plurality of X are either identical to or different from each other. It is preferable that all of X be a chlorine atom.

n represents an integer from 1 to 4. It is preferable that a be 3 or 4, and more preferably 4, from the viewpoint of controlling the tacticity of a repeating unit obtained by hydrogenating the main-chain double bonds of a ring-opening polymer obtained by subjecting tetracyclododecene or the like to ring-opening polymerization.

m represents (4-n).

p represents 1 or 2, and is preferably 2.

q represents (4-2p).

r represents 0 or 1, and is preferably 0.

Examples of the compound (1) and the compound (2) (hereinafter may be referred to as "Group 6 transition metal compound") used in connection with one embodiment of the invention include an oxymolybdenum compound such as tetraphenoxyoxymolybdenum(VI), tetrakis(2,6-dimethylphenoxy)oxymolybdenum(VI), tetrakis(2,6-diisopropylphenoxy)oxymolybdenum(VI), bis{2,2'-methylenebis(4-methyl-6-t-butylphenoxy)}oxymolybdenum(VI), bis(1,1'-binaphthyl-2,2'-dioxy)oxymolybdenum(VI), bis{3,3'-di(t-butyl)-5,5',6,6'-tetramethyl-2,2'-biphenoxy}oxymolybdenum(VI), bis{3,3'-diphenyl-1,1'- binaphthyl-2,2'-dioxy}oxymolybdenum(VI), {3,3'-di(t-butyl)-5,5',6,6'-tetramethyl-2,2'-biphenoxy}oxymolybdenum(VI) dichloride, bis(2,6-dimethylphenoxy)oxymolybdenum(VI) dichloride, bis(2,6-diisopropylphenoxy)oxymnolybdenum(VI) dichloride, (1,1'-binaphthyl-2,2'-dioxy)oxymolybdenum(VII) dichloride, tris(2,6-dimethylphenoxy)oxymolybdenum(VI) chloride, and triskis(2,6-diisopropylphenoxy)oxymolybdenum (VI) chloride;

an imidomolybdenum compound such as tetraphenoxy(phenylimido)molybdenum(VI), tetrakis(2,6-dimethylphenoxy)(phenylimido)molybdenum(VI), tetrakis(2,6-diisopropylphenoxy)(phenylimido)molybdenum(VI), bis{2,2'-methylenebis-(4-methyl-6-t-butylphenoxy)}(phenylimido)molybdenum(VI), bis(1,1'-binaphthyl-2,2'-dioxy)(phenylimido)molybdenum(VI), bis{3,3'-di(t-butyl)-5,5',6,6'-tetramethyl-2,2'-biphenoxy}(phenylimido) molybdenum(VI), bis{3,3'-di(t-butyl)-5,5',6,6'-tetramethyl-2,2'-biphenoxy}(2,6-diisopropylphenylimido) molybdenum(VI), bis{3,3'-di(t-butyl)-5,5',6,6'-tetramethyl-2,2'-biphenoxy}(cyclohexylimido) molybdenum(VI), {3,3'-di(t-butyl)-5,5',6,6'-tetramethyl-2,2'-bipheoxy}(phenylimido) molybdenum(VI) dichloride, bis{3,3'-diphenyl-1,1'-binaphthyl-2,2'-dioxy}(phenylimido)molybdenum(VI), bis{3,3'-diphenyl-1,1'-binaphthyl-2,2'-dioxy)(2,6-diisopropylphenylimido) molybdenum(VI), bis(3,3'-diphenyl-1,1'-binaphthyl-2,2'-dioxy}(adamantylimido)molybdenum(VI), and {3,3'-diphenyl-1,1'-binaphthyl-2,2'-dioxy}(phenylimido)molybdenum(VI)dichloride;

an oxytungsten compound such as tetraphenoxyoxytungsten (VI), tetrakis(2,6-dimethylphenoxy)oxytungsten(V) tetrakis(2,6-diisopropylphenoxy)oxytungsten(VI), bis{2,2'-methylenebis-(4-methyl-6-t-butylphenoxy)}oxytungsten (VI), bis(1,1'-binaphthyl-2,2'-dioxy)oxytungsten(VI), bis{3,3'-di(t-butyl)-5,5',6,6'-tetramethyl-2,2'-biphenoxy}oxytungsten(VI) bis{3,3'-diphenyl-11'-binaphthyl-2,2'-dioxy}oxytugsten(VI), {3,3'-di(t-butyl)-5,5',6,6'-tetramethyl-2,2'-biphenoxy}oxytungsten(VI) dichloride, bis(2,6-dimethylphenoxy)oxytungsten(VI) dichloride, and (1,1'-binaphthyl-2,2'-dioxy)oxytungsten (VI) dichloride;

an imidotungsten compound such as tetraphenoxy(phenylimido)tungsten(VI), tetrakis(2,6-dimethylphenoxy) (phenylimido)tungsten(VI), tetrakis(2,6-diisopropylphenoxy)(phenylimido)tungsten(VI), bis{2,2'-methylenebis-(4-ethyl-6-t-butylpheoxy)}(phenylimido)tungsten(VI), bis(1,1'-binaphthyl-2,2'-dioxy)(phenylimido)tungsten (VI), bis{3,3'-di(t-butyl)-5,5',6,6'-tetramethyl-2,2'-biphenoxy}(phenylimido)tungsten(VI), bis{3,3'-di(t-butyl)-5,5',6,6'-tetramethyl-2,2'-biphenoxy}(2,6-diisopropylphenylimido) tungsten(VI), bis{3,3'-di(t-butyl)-5,5',6,6'-tetramethyl-2,2'-biphenoxy}(2,6-diisopropylphenyliimido) tungsten(VI), bis{3,3'-di(t-butyl)-5,5',6,6'-tetramethyl-2,2'-biphenoxy}(ethylimido) tungsten(VI), {3,3'-di(t-butyl)-5,5',6,6'-tetramethyl-2,2'-biphenoxy}(phenylimido)tungsten(VI), dichloride, bis{3,3'-diphenyl-1,1'-binaphthyl-2,2'-dioxy}(phenylimido) tungsten(VI), bis{3,3'-diphenyl-1,1'-binaphthyl-2,2'-dioxy}(2,6-diisopropylphenylimido) tungsten(VI), bis{3,3'-diphenyl-1,1'-binaphthyl-2,2'-dioxy}(adamantylimido) tungsten(VI), {3,3'-diphenyl-1,1'-binaphthyl-2,2'-dioxy} (phenylimido)tungsten(VI) dichloride, bisphenoxy (phenylimido)tungsten(VI) dichloride, bis(2,6-dimethylphenoxy)(phenylimido)tungsten(VI), bis(2,6-diisopropylphenoxy)(phenylimido)tungsten(VI) dichloride, trisphenoxy(phenylimido)tungsten(VI) chloride, tris(2,6-dimethylphenoxy)(phenylimido)tungsten (VI) chloride, and tris(2,6-diisopropylphenoxy)(phenylimido)tungsten(VI) chloride; and the like.

The Group 6 transition metal compound used in connection with one embodiment of the invention may be synthesized using an arbitrary method. For example, the compound represented by the formula (1) wherein L is an imido ligand may be obtained by reacting an oxyhalide of a transition metal that belongs to Group 6 in the periodic table, or an imidohalide of a transition metal that belongs to Group 6 in the periodic table, with a metal salt of unsubstituted or substituted phenol (phenol metal salt). An oxychloride of a transition metal that belongs to Group 6 in the periodic table, or an imidochloride of a transition metal that belongs to Group 6 in the periodic table, is preferably used as the oxyhalide of a transition metal that belongs to Group 6 in the periodic table, or the imidohalide of a transition metal that belongs to Group 6 in the periodic table, from the viewpoint of reactivity and versatility.

Examples of the oxychloride of a transition metal that belongs to Group 6 in the periodic table, include oxymolybdenum tetrachloride, oxytungsten tetrachloride, and the like.

Examples of the imidochloride of a transition metal that belongs to Group 6 in the periodic table, include phenylimidomolybdenum tetrachloride, 2,6-diisopropylphenylimidomolybdenum tetrachloride, cyclohexylimidomolybdenum tetrachloride, adamantylimidomolybdenum tetrachloride, phenylimidotungsten tetrachloride, 2,6-diisopropylphenylimidotungsten tetrachloride, cyclohexylimidotungsten tetrachloride, ethylimidotungsten tetrachloride, adamantylimidotungsten tetrachloride, and the like.

Note that the imidohalide of a transition metal that belongs to Group 6 in the periodic table may be obtained by reacting an oxytungsten tetrahalide with a substituted isocyanate (when M is tungsten), or reacting a molybdenum tetrahalide with a substituted azide (when M is molybdenum).

The oxyhalide of a transition metal that belongs to Group 6 in the periodic table, or the imidohalide of a transition metal that belongs to Group 6 in the periodic table, may be a compound in which 1 equivalent of an electron-donating base is coordinated. Examples of the electron-donating base include diethyl ether, dibutyl ether, tetrahydrofuran, pyridine, 2,6-lutidine, and triethylamine.

A phenol alkali metal salt is preferable as the phenol metal salt. Specific examples of the phenol metal salt include phenoxylithium, 2,6-dimethylphenoxylithium, 2,6-diisopropylphenoxylithium, 2,2'-methylenebis-(4-methyl-6-t-butylphenoxy)lithium, (1,1'-binaphthyl-2,2'-dioxy)dilithium, 3,3'-di(t-butyl)-5,5',6,6'-tetramethyl-2,2'-biphenoxydilithium, 3,3'-diphenyl-1,1'-binaphthyl-2,2'-dioxylithium, and the like.

The polymerization catalyst may include an additional component in addition to the Group 6 transition metal compound. When the polymerization catalyst includes an organometallic compound other than the Group 6 transition metal compound as a cocatalyst, the polymerization catalyst exhibits improved activity.

An organometallic compound that includes a hydrocarbon group having 1 to 20 carbon atoms, and a metal that belongs to Group 1, 2, 12, 13, or 14 in the periodic table is preferable as the organometallic compound. An organolithium compound, an organomagnesium compound, an organozinc compound, an organoaluminum compound, and an organotin compound are more preferable, and an organolithium compound and an organoaluminum compound are particularly preferable.

Examples of the organolithium compound include n-butyllithium, methyllithium, phenyllithium, neopentyllithium, neophyllithium, and the like.

Examples of the organomagnesium compound include butylethylmagnesium, butyloctylmagnesium, dihexylmagnesium, ethylmagnesium chloride, n-butylmagnesium chloride, allylmagnesium bromide, neopentylmagnesium chloride, neophylmagnesium chloride, and the like.

Examples of the organozinc compound include dimethylzinc, diethylzinc, and diphenylzinc. Examples of the organoaluminum compound include trimethylaluminum, triethylaluminum, triisobutylahnninum, diethylaluminum chloride, diethylahnninum ethoxide, ethylaluminum dichloride, ethylaluminum diethoxide, and the like.

Examples of the organotin compound include tetramethyltin, tetra(n-butyl)tin, tetraphenyltin, and the like.

The organometallic compound is normally added in an amount of 0.1 to 100-fold mol, preferably 0.2 to 50-fold mol, and more preferably 0.5 to 20-fold mol, based on the center metal of the Group 6 transition metal compound. If the organometallic compound is added in too small an amount, the polymerization activity may not be sufficiently improved. If the organometallic compound is added in too large an amount, a side reaction may easily occur.

The Group 6 transition metal compound may be used in an arbitrary amount. The Group 6 transition metal compound is preferably used in such an amount that the molar ratio of the transition metal included in the Group 6 transition metal compound to the tetracyclododecene-based monomer is 1:10 to 1:2,000,000, more preferably 1:200 to 1:1,000,000, and particularly preferably 1:500 to 1:500,000. If the polymerization catalyst is used in too large an amount, it may be difficult to remove the polymerization catalyst. If the polymerization catalyst is used in too small an amount, sufficient polymerization activity may not be obtained.

The polymerization reaction may be effected in a solvent-free system. Note that it is preferable to effect the polymerization reaction in an organic solvent since the reaction can be advantageously controlled.

The organic solvent is not particularly limited as long as the organic solvent can dissolve or disperse the resulting ring-opening polymer, and is inert to the polymerization reaction. Specific examples of the organic solvent include an aliphatic hydrocarbon-based solvent such as pentane, hexane, and heptane; an alicyclic hydrocarbon-based solvent such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindenecyclohexane, and cyclooctane; an aromatic hydrocarbon-based solvent such as benzene, toluene, and xylene; a halogen-containing aliphatic hydrocarbon-based solvent such as dichloromethane, chloroform, and 1,2-dichloroethane; a halogen-containing aromatic hydrocarbon-based solvent such as chlorobenzene and dichlorobenzene; a nitrogen-containing hydrocarbon-based solvent such as nitromethane, nitrobenzene, and acetonitrile; an ether-based solvent such as diethyl ether and tetrahydrofuran; an aromatic ether-based solvent such as anisole and phenetole; and the like. Among these, an aromatic hydrocarbon-based solvent, an aliphatic hydrocarbon-based solvent, an alicyclic hydrocarbon-based solvent, an ether-based solvent, and an aromatic ether-based solvent are particularly preferable.

When effecting the polymerization reaction in the organic solvent, the concentration of the tetracyclododecene-based monomer in the reaction system is not particularly limited, but is preferably 1 to 50 wt %, more preferably 2 to 45 wt %, and particularly preferably 3 to 40 wt/%. If the concentration of the tetracyclododecene-based monomer is too low, productivity may decrease. If the concentration of the tetracyclododecene-based monomer is too high, the viscosity of the reaction solution may increase to a large extent after completion of the polymerization reaction, and it may be difficult to effect the subsequent hydrogenation reaction.

The polymerization temperature is not particularly limited, but is normally −30 to +200° C., and preferably 0 to 180° C. The polymerization time is determined taking account of the reaction scale, but is normally selected within the range from 1 minute to 100 hours.

When effecting the polymerization reaction, a vinyl compound or a diene compound may be added to the polymerization reaction system in order to adjust the molecular weight of the resulting ring-opening polymer.

The vinyl compound is not particularly limited as long as the vinyl compound is an organic compound that includes a vinyl group. Examples of the vinyl compound include an alpha-olefin such as 1-butene, 1-pentene, 1-hexene, and 1-octene; styrene and a derivative thereof, such as styrene and vinyltoluene; an ether such as ethyl vinyl ether, i-butyl vinyl ether, and allyl glycidyl ether; a halogen-containing vinyl compound such as allyl chloride; an oxygen-containing vinyl compound such as allyl acetate, allyl alcohol, and glycidyl methacrylate; a nitrogen-containing vinyl compound such as acrylamide; a silicon-containing vinyl compound such as vinyltrimethylsilane and vinyltrimethoxysilane; and the like.

Examples of the diene compound include a non-conjugated diene such as 1,4-pentadiene, 1,4-hexadiene, 1,5-hexadiene, 1,6-heptadiene, 2-methyl-1,4-pentadiene, and 2,5-dimethyl-1,5-hexadiene; a conjugated diene such as 1,3-butadiene, 2-methyl-1,3-butadiene, 2,3-dimethyl-1,3-butadiene, 1,3-pentadiene, and 1,3-hexadiene; and the like.

The vinyl compound or the diene compound is added in such an amount that a ring-opening polymer having the desired molecular weight can be obtained. The vinyl compound or the diene compound is normally added in a ratio of 0.1 to 10 mol % based on the tetracyclododecene-based monomer.

A tetracyclododecene-based ring-opening polymer having isotacticity can be obtained by subjecting the tetracyclododecene-based monomer to a ring-opening (co)polymerization reaction using the Group 6 transition metal compound as the polymerization catalyst.

Since the tacticity of the tetracyclododecene-based ring-opening polymer does not change due to the hydrogenation reaction by effecting the hydrogenation reaction as described below, a hydrogenated tetracyclododecene-based ring-opening polymer having isotacticity and crystallinity can be obtained by subjecting the tetracyclododecene-based ring-opening polymer to the hydrogenation reaction. Note that the tetracyclododecene-based ring-opening polymer may be collected from the reaction mixture, and then subjected to the hydrogenation reaction, or the reaction mixture including the tetracyclododecene-based ring-opening polymer may be subjected directly to the hydrogenation reaction.

The number average molecular weight (Mn) of the tetracyclododecene-based ring-opening polymer obtained as described above determined by $^1$H-NMR is not particularly limited, but is 500 to 1,000,000, preferably 1,000 to 600,000, and more preferably 2,000 to 400,000. The number average molecular weight (Mn) of the tetracyclododecene-based ring-opening polymer is determined as described below. Specifically, the ratio of the number of hydrogen atoms present at the terminals of the polymer chain to the number of hydrogen atoms present in the polymer chain excluding the terminals is calculated based on the $^1$H-NMR measurement results, and the number average molecular weight of the tetracyclododecene-based ring-opening polymer is calculated based on the calculated ratio. A hydrogenated tetracyclododecene-based ring-opening polymer that exhibits particularly excellent heat resistance and excellent processability can be obtained by subjecting the tetracyclododecene-based ring-opening polymer having a number average molecular weight within the above range to the hydrogenation reaction.

Step (II)

In the step (II), the main-chain carbon-carbon double bonds of the tetracyclododecene-based ring-opening polymer obtained by the step (I) are hydrogenated using hydrogen and the hydrogenation catalyst to obtain the hydrogenated tetracyclododecene-based ring-opening polymer according to one embodiment of the invention.

A hydrogenation catalyst commonly used to hydrogenate an olefin compound may be used as the hydrogenation catalyst. Examples of the hydrogenation catalyst include a hydrogenation catalyst that includes a dicyclopentadienyltitanium halide, a nickel organic carboxylate, a cobalt organic carboxylate, or the like, and an organometallic compound that includes a metal that belongs to Group 1, 2, or 3 in the periodic table; a metal catalyst such as nickel, platinum, palladium, ruthenium, or rhenium supported on carbon, silica, diatomaceous earth, or the like, a rhodium metal catalyst, a cobalt complex, a nickel complex, a rhodium complex, and a ruthenium complex; a hydrogenated compound such as lithium aluminum hydride and p-toluenesulfonyl hydrazide; and the like. Among these, a ruthenium compound is preferable since the target product can be obtained in high yield while suppressing isomerization.

Examples of the ruthenium compound include RuHCl(CO)(PPh$_3$)$_3$, RuHCl(CO)[P(p-Me-Ph)$_3$]$_3$, RuHCl(CO)(PCy$_3$)$_2$, RuHCl(CO)[P(n-Bu)$_3$]$_3$, RuHCl(CO)[P(i-Pr)$_3$]$_2$, RuH$_2$(COXPPh$_3$h, RuH$_2$(CO)[P(p-Me-Ph)$_3$]$_3$, RuH$_2$(COXPCy$_3$)$_3$, RuH$_2$(CO)[P(n-Bu)$_3$]$_3$RuH(OCOCH$_3$)(CO)(PPh$_3$)$_2$, RuH(OCOPh)(CO)(PPh$_3$)$_2$, RuH(OCOPh-CH$_3$)(CO)(PPh$_3$)$_2$, RuH(OCOPh-OCH$_3$)(CO)(PPh$_3$)$_2$. RuH(OC-OPh)(CO)(PCy$_3$)$_2$, and the like.

The hydrogenation reaction is normally effected in an inert organic solvent. Examples of the inert organic solvent include an aromatic hydrocarbon such as benzene, toluene, and xylene; an aliphatic hydrocarbon-based solvent such as pentane and hexane; an alicyclic hydrocarbon-based solvent such as cyclohexane and decahydronaphthalene; an ether-based solvent such as tetrahydrofuran and ethylene glycol dimethyl ether, and the like.

In the step (II), hydrogen is added to the system that includes the tetracyclododecene-based ring-opening polymer and the hydrogenation catalyst to hydrogenate the carbon-carbon double bonds included in the tetracyclododecene-based ring-opening polymer.

The hydrogenation temperature is selected taking account of the type of hydrogenation catalyst. The hydrogenation temperature is normally set to −20 to +250° C., preferably −10 to +220° C., and more preferably from 0 to +200° C. If the hydrogenation temperature is too low, the reaction rate may decrease to a large extent. If the hydrogenation temperature is too high, a side reaction may occur.

The hydrogen pressure is normally set to 0.01 to 20 MPa, preferably 0.05 to 15 MPa, and more preferably 0.1 to 10 MPa. If the hydrogen pressure is too low, the reaction (hydrogenation) rate may decrease to a large extent. If the hydrogen pressure is too high, it may be necessary to use a reactor that can endure high pressure (i.e., the reaction equipment is limited).

The hydrogenation time is determined taking account of the reaction scale, but is normally set to 0.1 to 10 hours.

After completion of the hydrogenation reaction, the resulting hydrogenated tetracyclododecene-based ring-opening polymer is collected using an ordinary method. The residual catalyst may be removed by filtration or the like.

The hydrogenation ratio of the ring-opening polymer achieved by the hydrogenation reaction (i.e., the ratio of main-chain double bonds that have been hydrogenated) is not particularly limited, but is preferably 98% or more, more preferably 99% or more, and particularly preferably 99.5% or more. The resulting hydrogenated tetracyclododecene-based ring-opening polymer exhibits better heat resistance and processability as the hydrogenation ratio increases.

The hydrogenated tetracyclododecene-based ring-opening polymer may or may not have a specific tacticity as long as the hydrogenated tetracyclododecene-based ring-opening polymer has crystallinity (i.e., has a melting point), and the ratio of meso diads is 65% or more. The hydrogenated tetracyclododecene-based ring-opening polymer obtained using the production method according to one embodiment of the invention normally has isotacticity.

The hydrogenated tetracyclododecene-based ring-opening polymer obtained using the production method according to one embodiment of the invention is a crystalline polymer that has a high melting point and a high glass transition temperature, and rarely shows a decrease in melting point even when heated at a temperature higher than the melting point. Therefore, the crystalline hydrogenated tetracyclododecene-based ring-opening polymer exhibits excellent heat resistance even after being formed by a melt forming process (i.e., exhibits excellent heat resistance and excellent processability), and may particularly suitably be used as a material for producing a formed article for which heat resistance is required. The applications of the formed article produced using the hydrogenated tetracyclododecene-based ring-opening polymer are not particularly limited. Examples of the applications of the formed article include an optical reflector, an insulating material, an optical film, a connector, a food packaging material, a bottle, a pipe, a gear, fibers, a nonwoven fabric, and the like.

EXAMPLES

The invention is further described below by way of examples. Note that the invention is not limited to the following examples.

The following measurement methods and evaluation methods were used in connection with the examples.

(1) Number Average Molecular Weight of Tetracyclododecene-Based Ring-Opening Polymer The ratio of the number of hydrogen atoms present at the terminals of the polymer chain to the number of hydrogen atoms present in the polymer chain excluding the terminals was calculated based on the $^1$H-NMR measurement results, and the number average molecular weight of the tetracyclododecene-based ring-opening polymer was calculated based on the calculated ratio.

(2) Copolymerization Compositional Ratio of Tetracyclododecene-Based Ring-Opening Polymer The ratio of the number of hydrogen atoms derived from the tetracyclododecene unit to the number of hydrogen atoms derived from the monomer unit other than the tetracyclododecene unit was calculated based on the $^1$H-NMR measurement results, and the copolymerization compositional ratio (wt %) of the tetracyclododecene-based ring-opening polymer was calculated based on the calculated ratio.

(3) Hydrogenation Ratio of Tetracyclododecene-Based Ring-Opening Polymer

The hydrogenation ratio of the tetracyclododecene-based ring-opening polymer was calculated based on the $^1$H-NMR measurement results.

(4) Ratio of Meso Diads to Racemo Diads in Hydrogenated Tetracyclododecene-Based Ring-Opening Polymer The ratio of meso diads to racemo diads in the hydrogenated tetracyclododecene-based ring-opening polymer was determined by subjecting the hydrogenated tetracyclododecene-based ring-opening polymer to $^{13}$C-NMR measurement at 210° C. using o-dichlorobenzene-d$_4$/trichlorbenzene mixed solvent, and calculating the ratio of meso diads to racemo diads based on the intensity ratio of the signal at 51.40 ppm (attributed to meso diads) to the signal at 51.53 ppm (attributed to racemo diads).

(5) Melting Point and Glass Transition Temperature of Hydrogenated Tetracyclododecene-Based Ring-Opening Polymer The melting point of the hydrogenated tetracyclododecene-based ring-opening polymer was measured using a differential scanning calorimeter (DSC) ("X-DSC7000" manufactured by SII NanoTechnology Inc.) at a heating rate of 10° C./min (independently of the thermal history of the resin). A temperature at which the endothermic calorific value was a maximum with respect to the first-order phase transition peak due to crystal melting was taken as the melting point. The glass transition temperature of the hydrogenated tetracyclododecene-based ring-opening polymer was measured by heating an amorphous sample (prepared by melting the resin at a high temperature, and instantaneously introducing the molten resin into liquid nitrogen to rapidly cool the resin) at a heating rate of 10° C./min using a differential scanning calorimeter (DSC).

(6) Degree of Crystallinity of Hydrogenated Tetracyclododecene-Based Ring-Opening Polymer The melt-formed sample (see (7)) was subjected to X-ray diffraction analysis using a wide-angle X-ray diffractometer ("RINT 2000" manufactured by Rigaku Corporation) to measure the crystalline peak and the amorphous halo, and the intensity ratio thereof was calculated to determine the degree of crystallinity based on the weight ratio.

(7) Solder Immersion Test of Hydrogenated Tetracyclododecene-Based Ring-Opening Polymer The hydrogenated ring-opening polymer was hot-pressed (melt-formed) using a metal die (10×100×1 mm), and cooled at a cooling rate of 10° C./min to prepare a sample (hereinafter may be referred to as "melt-formed sample"). The sample was immersed in solder at 260° C. for 20 seconds, and the presence or absence of deformation was observed with the naked eye. A case where deformation was not observed (i.e., the sample exhibited excellent heat resistance) was evaluated as "Good", and a case where deformation was observed was evaluated as "Bad".

(8) Curling Value of Hydrogenated Tetracyclododecene-Based Ring-Opening Polymer

One end of the melt-formed sample subjected to the solder immersion test was placed on a horizontal plane, and the distance between the other end of the sample (in the longitudinal direction) and the horizontal plane was measured, and taken as the curling value (mm). It was determined that the sample exhibited better heat resistance as the curling value decreased.

Synthesis Example 1: Synthesis of tetrakis(2,6-dimethylphenoxy)oxymolybdenum(VI)

A glass reactor equipped with a stirrer was charged with 2.54 g of a molybdenum oxytetrachloride complex (Mo(=O)Cl$_4$) and 50 ml of toluene, and the mixture was cooled to −78° C. A solution prepared by dissolving 5.12 g of 2,6-dimethylphenoxylithium in 50 ml of toluene was cooled to −78° C., and added to the mixture. The resulting mixture was heated to 100° C., and reacted at 100° C. for 18 hours. After completion of the reaction, n-hexane was added to the reaction mixture so that the n-hexane/toluene weight ratio was 1/1, and a white precipitate was filtered off using Celite. The solvent was completely evaporated from the filtrate to obtain a blue solid (yield: 93%). The blue solid was dissolved in a toluene/n-hexane (=1/1 (weight ratio)) mixture. The resulting solution was cooled to −30° C., and allowed to stand to effect recrystallization to obtain a solid (blue needle-like crystals). The yield of the solid was 3.28 g (55%). The solid was identified by $^1$H-NMR, $^{13}$C-NMR, and elemental analysis to be tetrakis(2,6-dimethylphenoxy)oxymolybdenum(VI).

Synthesis Example 2: Synthesis of bis{3,3'-di(t-butyl)-5,5',6,6'-tetramethyl-2,2'-biphenoxy}phenylimidotungsten(VI)

A glass reactor equipped with a stirrer was charged with 2.90 g of a phenylimidotungsten tetrachloride diethyl ether complex (W(=NPh)Cl$_4$(Et$_2$O)) and 30 ml of diethyl ether, and the mixture was cooled to −78° C. A solution prepared by dissolving 4.19 g of 3,3'-di(t-butyl)-5,5',6,6'-tetramethyl-2,2'-biphenoxylithium in 30 ml of diethyl ether was added to the mixture. The resulting mixture was gradually returned to room temperature (25° C. (hereinafter the same)), and reacted at room temperature for 18 hours. After completion of the reaction, diethyl ether was evaporated from the reaction mixture. The residue was dissolved in a toluene/n-hexane (=1/3 (weight ratio)) mixed solvent, and a white precipitate was filtered off using Celite. The solvent was completely evaporated from the filtrate to obtain a red solid (yield: 96%). The red solid was cooled to −30° C., and allowed to stand to effect recrystallization to obtain a solid (red needle-like microcrystals). The yield of the solid was 4.63 g (80%). The solid was identified by $^1$H-NMR, $^{13}$C-NMR, and elemental analysis to be bis{3,3'-di(t-butyl)-5,5',6,6'-tetramethyl-2,2'-biphenoxy}phenylimidotungsten(VI).

Example 1

A glass reactor equipped with a stirrer was charged with 0.0338 g of a tetrakis(2,6-dimethylphenoxy)oxymolybdenum(VI) obtained in Synthesis Example 1 and 5 ml of toluene, and the mixture was cooled to −78° C. After the addition of a solution prepared by dissolving 0.00726 g of n-butyllithium in 1 ml of n-hexane to the mixture, the resulting mixture was returned to room temperature, and reacted at room temperature for 15 minutes. After the addition of 7.5 g of tetracyclododecene (TCD), 27 g of cyclohexane, and 0.26 g of 1-hexene to the reaction mixture, a polymerization reaction was effected at 80° C. The viscosity of the reaction mixture gradually increased after the start of the polymerization reaction. After 2 hours had elapsed from the start of the polymerization reaction, a large quantity of acetone was poured into the reaction mixture to aggregate a precipitate, and the aggregate was filtered off. The aggregate was then washed with methanol, and dried at 40° C. for 24 hours under reduced pressure. 7.4 g of a ring-opening polymer was thus obtained. The ring-opening polymer had a number average molecular weight of 22,000.

An autoclave equipped with a stirrer was charged with 3.0 g of the ring-opening polymer obtained as described above and 47 g of cyclohexane. After the addition of a dispersion prepared by dispersing 0.00157 g of $RuHCl(CO)(PPh_3)_2$ in 10 ml of cyclohexane, a hydrogenation reaction was effected at 160° C. for 8 hours under a hydrogen pressure of 4.0 MPa. The reaction mixture was poured into a large quantity of acetone to completely precipitate the resulting hydrogenated ring-opening polymer which was filtered off. The hydrogenated ring-opening polymer was then washed with methanol, and dried at 40° C. for 24 hours under reduced pressure. The hydrogenation ratio of the resulting hydrogenated ring-opening polymer 1 was 99.5% or more, and the ratio of meso diads to racemo diads in the hydrogenated ring-opening polymer was 70:30 (i.e., the hydrogenated ring-opening polymer 1 was isotactic).

The hydrogenated ring-opening polymer 1 was heated at a heating rate of 10° C./min using a DSC to measure the melting point. The melting point measured in a state in which the hydrogenated ring-opening polymer 1 had not been subjected to a thermal history was 315° C.

A sample that had been heated to 340° C. (completely melted) in the DSC was introduced into liquid nitrogen in a molten state to prepare a quench-cooled amorphous sample, and the amorphous sample was heated at a heating rate of 10° C./min. A glass transition temperature was observed at 166° C.

Next the amorphous sample was heated to 340° C. (completely melted) in the DSC and was cooled to room temperature at a cooling rate of 10° C./min to solidify the sample, and the solidified sample was heated at a heating rate of 10° C./min. A peak attributed to cold crystallization was observed to only a small extent during heating, and a melting point was observed at 312° C.

The hydrogenated ring-opening polymer 1 was heated at 330° C. for 10 minutes (sufficiently melted), and melt-formed using the specific metal die. The melt-formed product was cooled to room temperature at a cooling rate of 10° C./min to solidify the melt-formed product to prepare a melt-formed sample. When the melt-formed sample was subjected to wide-angle X-ray diffraction analysis, a sharp peak attributed to crystal diffraction was observed. It was thus confirmed that the melt-formed sample was crystalline. The sharp peak attributed to crystal diffraction and the amorphous halo were subjected to a waveform separation process to calculate the degree of crystallinity (based on weight ratio) of the melt-formed sample. The degree of crystallinity of the melt-formed sample thus calculated was 28%.

When the melt-formed sample was then subjected to DSC analysis, a peak attributed to cold crystallization was observed to only a small extent during heating, and an endothermic peak was observed at 312° C. It was thus confirmed that the melting point of the crystal included in the melt-formed sample was 312° C. Therefore, crystallization proceeded to a sufficient extent when the melt-formed product was cooled to room temperature at a cooling rate of 10° C./min using the specific metal die, and a crystalline resin was obtained. The melt-formed sample was also subjected to the solder immersion test and the curling value measurement process. The results are shown in Table 1.

Example 2

A glass reactor equipped with a stirrer was charged with 0.0556 g of bis {(3,3'-di(t-butyl)-5,5',6,6'-tetramethyl-2,2'-biphenoxy}phenylimidotungsten(VI) obtained in Synthesis Example 2 and 4 ml of toluene, and the mixture was cooled to −78° C. After the addition of a solution prepared by dissolving 0.00726 g of n-butyllithium in 1 ml of hexane to the mixture, the resulting mixture was returned to room temperature, and reacted at room temperature for 15 minutes. After the addition of 7.0 g of tetracyclododecene (TCD), 3.0 g of dicyclopentadiene (DCP), 27 g of cyclohexane, and 0.32 g of 1-hexene to the reaction mixture, a polymerization reaction was effected at 80° C. The viscosity of the mixture gradually increased after the start of the polymerization reaction, and the mixture became slightly cloudy. After 2 hours had elapsed from the start of the polymerization reaction, a large quantity of acetone was poured into the reaction mixture to aggregate a precipitate, and the aggregate was filtered off, washed, and dried at 40° C. for 24 hours under reduced pressure. 9.7 g of a ring-opening polymer was thus obtained. The copolymerization compositional ratio (weight ratio) of tetracyclododecene to dicyclopentadiene in the ring-opening polymer calculated from the $^1$H-NMR spectrum data was 69:31, and the number average molecular weight of the ring-opening polymer was 22,600.

An autoclave equipped with a stirrer was charged with 3.0 g of the ring-opening polymer obtained as described above and 47 g of cyclohexane. After the addition of a dispersion prepared by dispersing 0.00157 g of $RuHCl(COXPPh_3)_2$ in 10 ml of cyclohexane, a hydrogenation reaction was effected at 160° C. for 8 hours under a hydrogen pressure of 4.0 MPa. The reaction mixture was poured into a large quantity of acetone to completely precipitate the resulting hydrogenated ring-opening polymer, which was filtered off. The hydrogenated ring-opening polymer was then washed with methanol, and dried at 40° C. for 24 hours under reduced pressure. The hydrogenation ratio of the resulting hydrogenated ring-opening polymer 2 was 99.5% or more, and the ratio of meso diads to racemo diads in the repeating unit derived from tetracyclododecene was 95:5.

The hydrogenated ring-opening polymer 2 was heated at a heating rate of 10° C./min using a DSC to measure the melting point. The melting point measured in a state in which the hydrogenated ring-opening polymer 2 had not been subjected to a thermal history was 338° C.

A sample that had been heated to 345° C. (completely melted) in the DSC was introduced into liquid nitrogen in a molten state to prepare a quench-cooled amorphous sample, and the amorphous sample was heated at a heating rate of 10° C./min. A glass transition temperature was observed at 142° C.

Next the amorphous sample was heated to 345° C. (completely melted) in the DSC and was cooled to room temperature at a cooling rate of 10° C./min to solidify the sample, and the solidified sample was heated at a heating rate of 10° C./min. A peak attributed to cold crystallization was observed to only a small extent during heating, and a melting point was observed at 342° C.

The hydrogenated ring-opening polymer 2 that had been dried under reduced pressure was heated at 345° C. for 10 minutes (sufficiently melted), and melt-formed using the specific metal die. The melt-formed product was cooled to room temperature at a cooling rate of 10° C./min to solidify the melt-formed product to prepare a melt-formed sample. When the melt-formed sample was subjected to wide-angle X-ray diffraction analysis, a sharp peak attributed to crystal diffraction was observed. It was thus confirmed that the melt-formed sample was crystalline. The sharp peak attributed to crystal diffraction and the amorphous halo were subjected to a waveform separation process to calculate the degree of crystallinity (based on weight ratio) of the melt-formed sample. The degree of crystallinity of the melt-formed sample thus calculated was 21%.

When the melt-formed sample was then subjected to DSC analysis, a peak attributed to cold crystallization was observed to only a small extent during heating, and an endothermic peak was observed at 342° C. It was thus confirmed that the melting point of the crystal included in the melt-formed sample was 342° C. Therefore, crystallization proceeded to a sufficient extent when the melt-formed product was cooled to room temperature at a cooling rate of 10° C./min using the specific metal die, and a crystalline resin was obtained. The melt-formed sample was also subjected to the solder immersion test and the curling value measurement process. The results are shown in Table 1.

Example 3

A glass reactor equipped with a stirrer was charged with 0.0556 g of bis {3,3'-di(t-butyl)-5,5',6,6'-tetramethyl-2,2'-biphenoxy}phenylimidotungsten(VI) obtained in Synthesis Example 2 and 4 ml of toluene, and the mixture was cooled to −78° C. After the addition of a solution prepared by dissolving 0.00726 g of n-butyllithium in 1 ml of hexane to the mixture, the resulting mixture was returned to room temperature (25° C.), and reacted at room temperature for 15 minutes. After the addition of 9.0 g of tetracyclododecene (TCD), 1.0 g of norbornene (NB), 27 g of cyclohexane, and 0.32 g of 1-hexene to the reaction mixture, a polymerization reaction was effected at 80° C. The viscosity of the reaction mixture gradually increased after the start of the polymerization reaction. After 2 hours had elapsed from the start of the polymerization reaction, a large quantity of acetone was poured into the reaction mixture to aggregate a precipitate, and the aggregate was filtered off, washed with methanol, and dried at 40° C. for 24 hours under reduced pressure. 9.6 g of a ring-opening polymer was thus obtained. The copolymerization compositional ratio (weight ratio) of tetracyclododecene to norbornene in the ring-opening polymer calculated from the $^1$H-NMR spectrum data was 92:8, and the number average molecular weight of the ring-opening polymer was 19,500.

An autoclave equipped with a stirrer was charged with 3.0 g of the ring-opening polymer obtained as described above and 47 g of cyclohexane. After the addition of a dispersion prepared by dispersing 0.00157 g of RuHCl(CO)(PPh$_3$)$_2$ in 10 ml of cyclohexane, a hydrogenation reaction was effected at 160° C. for 8 hours under a hydrogen pressure of 4.0 MPa. The reaction mixture was poured into a large quantity of acetone to completely precipitate the resulting hydrogenated ring-opening polymer, which was filtered off. The hydrogenated ring-opening polymer was then washed with methanol, and dried at 40° C. for 24 hours under reduced pressure. The hydrogenation ratio of the resulting hydrogenated ring-opening polymer 3 was 99.5% s or more, and the ratio of meso diads to racemo diads in the repeating unit derived from tetracyclododecene was 95:5.

The hydrogenated ring-opening polymer 3 was heated at a heating rate of 10° C./min using a DSC to measure the melting point. The melting point measured in a state in which the hydrogenated ring-opening polymer 3 had not been subjected to a thermal history was 335° C. A sample that had been heated to 340° C. (completely melted) in the DSC was introduced into liquid nitrogen in a molten state to prepare a quench-cooled amorphous sample, and the amorphous sample was heated at a heating rate of 10° C./min. A glass transition temperature was observed at 141° C. Next the amorphous sample was heated to 340° C. (completely melted) in the DSC and was cooled to room temperature at a cooling rate of 10° C./min to solidify the sample, and the solidified sample was heated at a heating rate of 10° C./min. A peak attributed to cold crystallization was observed to only a small extent during heating, and a melting point was observed at 335° C.

The hydrogenated ring-opening polymer 3 that had been dried under reduced pressure was heated at 340° C. for 10 minutes (sufficiently melted), and melt-formed using the specific metal die. The melt-formed product was cooled to room temperature at a cooling rate of 10° C./min to solidify the melt-formed product to prepare a melt-formed sample. When the melt-formed sample was subjected to wide-angle X-ray diffraction analysis, a sharp peak attributed to crystal diffraction was observed. It was thus confirmed that the melt-formed sample was crystalline. The sharp peak attributed to crystal diffraction and the amorphous halo were subjected to a waveform separation process to calculate the degree of crystallinity (based on weight ratio) of the melt-formed sample. The degree of crystallinity of the melt-formed sample thus calculated was 20%.

When the melt-formed sample was then subjected to DSC analysis, a peak attributed to cold crystallization was observed to only a small extent during heating, and an endothermic peak was observed at 336° C. It was thus confirmed that the melting point of the crystal included in the melt-formed sample was 336° C. Therefore, crystallization proceeded to a sufficient extent when the melt-formed product was cooled to room temperature at a cooling rate of 10° C./min using the specific metal die, and a crystalline resin was obtained. The melt-formed sample was also subjected to the solder immersion test and the curling value measurement process. The results are shown in Table 1.

Comparative Example 1

A hydrogenated ring-opening polymer 1r was obtained in the same manner as in Example 1, except that a reaction product of 0.028 g of phenylimidotungsten(VI) tetrachloride diethyl ether and 0.022 g of diethylaluminum ethoxide was used as the polymerization catalyst instead of the reaction product of tetrakis(2,6-dimethylphenoxy)oxymolybdenum (I) and n-butyllithium. The hydrogenation ratio of the resulting hydrogenated ring-opening polymer 1r was 99.5% or more, and the ratio of meso diads to racemo diads was 18:82 (i.e., the hydrogenated ring-opening polymer 1r was syndiotactic).

The glass transition temperature of the hydrogenated ring-opening polymer 1r measured as described above was 162° C., and a melting point was not observed even when the hydrogenated ring-opening polymer 1r was heated to 345° C. A sample that had been heated to 345° C. (completely melted) in the DSC was introduced into liquid nitrogen in a molten state to prepare a quench-cooled amorphous sample, and the amorphous sample was heated at a heating rate of 10° C./min. A glass transition temperature was observed at 162° C., and a melting point was not observed. Next the amorphous sample was heated to 345° C. (completely melted) in the DSC and was cooled to room temperature at a cooling rate of 10° C./min to solidify the sample, and the solidified sample was heated at a heating rate of 10° C./min. A glass transition temperature was observed at 162° C. during heating, and a melting point was not observed.

The hydrogenated ring-opening polymer 1r that had been dried under reduced pressure was heated at 300° C. for 10 minutes (sufficiently melted), and melt-formed using the specific metal die. The melt-formed product was cooled to room temperature at a cooling rate of 10° C./min to solidify the melt-formed product to prepare a melt-formed sample. When the melt-formed sample was subjected to wide-angle X-ray diffraction analysis, a peak attributed to crystal diffraction was not observed, and only an amorphous halo was observed. Specifically, the degree of crystallinity (based on weight ratio) of the melt-formed sample was 0%. When the melt-formed sample was subjected to DSC analysis, a peak attributed to cold crystallization during heating and a peak attributed to crystal melting were not observed, and only a glass transition temperature was observed at 162° C. It was thus confirmed that the syndiotactic hydrogenated tetracyclododecene-based ring-opening polymer in which the ratio of meso diads was 18%, was amorphous independently of the thermal history and the forming conditions. The melt-formed sample was also subjected to the solder immersion test and the curling value measurement process. The results are shown in Table 1. Note that the curling value (mm) could not be measured due to significant deformation.

Comparative Example 2

A hydrogenated ring-opening polymer 2r was obtained in the same manner as in Example 1, except that a reaction product of 0.022 g of tungsten(VI) hexachloride and 0.022 g of diethylaluminum ethoxide was used as the polymerization catalyst instead of the reaction product of tetrakis(2,6-dimethylphenoxy)oxymolybdenum(VI) and n-butyllithium. The hydrogenation ratio of the resulting hydrogenated ring-opening polymer 2r was 99.5% or more, and the ratio of meso diads to racemo diads was 56:44 (i.e., the hydrogenated ring-opening polymer 2r was atactic).

The hydrogenated ring-opening polymer 2r was heated at a heating rate of 10° C./min using a DSC to measure the melting point. The melting point measured in a state in which the hydrogenated ring-opening polymer 2r had not been subjected to a thermal history was 280° C. A sample that had been heated to 340° C. (completely melted) in the DSC was introduced into liquid nitrogen in a molten state to prepare a quench-cooled amorphous sample. When the amorphous sample was heated at a heating rate of 10° C./min, a glass transition temperature was observed at 161° C. When the amorphous sample was further heated, an exothermic peak attributed to phase transition was observed at 245° C. This suggests that cold crystallization occurred. Next the amorphous sample was heated to 340° C. (completely melted) in the DSC and was cooled to room temperature at a cooling rate of 10° C./min to solidify the sample, and the solidified sample was heated at a heating rate of 10° C./min. A glass transition temperature was observed at 161° C. An exothermic peak attributed to cold crystallization was observed at 245° C., and an endothermic peak attributed to crystal melting was observed at 289° C. The exothermic peak and the endothermic peak were observed at the same calorific value (absolute value).

The hydrogenated ring-opening polymer that had been dried under reduced pressure was heated at 340° C. for 10 minutes (sufficiently melted), and melt-formed using the specific metal die. The melt-formed product was cooled to room temperature at a cooling rate of 10° C./min to solidify the melt-formed product to prepare a melt-formed sample. When the melt-formed sample was subjected to wide-angle X-ray diffraction analysis, a peak attributed to crystal diffraction was not observed, and only an amorphous halo was observed. Specifically, the degree of crystallinity (based on weight ratio) of the melt-formed sample was 0%.

When the melt-formed sample was subjected to DSC analysis, a glass transition temperature was observed at 161° C. during heating. A peak attributed to cold crystallization was observed at 245° C., and a peak attributed to crystal melting was observed at 289° C. These peaks were observed at the same calorific value (absolute value). It was thus confirmed that the atactic hydrogenated tetracyclododecene-based ring-opening polymer in which the ratio of meso diads was 56%, was not crystallized under the forming conditions in which the melt-formed product was cooled to room temperature at a cooling rate of 10° C./min using the specific metal die, and the melt-formed sample was amorphous. Therefore, the melt-formed sample did not have a melting point. The melt-formed sample was also subjected to the solder immersion test and the curling value measurement process. The results are shown in Table 1.

Comparative Example 3

A hydrogenated ring-opening polymer 3r was obtained in the same manner as in Example 1, except that a reaction product of 0.033 g of 2,6-diisopropylphenylimidotungsten (VI) tetrachloride diethyl ether and 0.022 g of diethylaluminum ethoxide was used as the polymerization catalyst instead of the reaction product of tetrakis(2,6-dimethylphenoxy)oxvmolybdenum(VI) and n-butyllithium. The hydrogenation ratio of the resulting hydrogenated ring-opening polymer 3r was 99.5% or more, and the ratio of meso diads to racemo diads was 60:40 (i.e., the hydrogenated ring-opening polymer 3r was atactic).

The hydrogenated ring-opening polymer 3r was heated at a heating rate of 10° C./min using a DSC to measure the melting point. The melting point measured in a state in which the hydrogenated ring-opening polymer 3r had not been subjected to a thermal history was 295° C. A sample that had been heated to 340° C. (completely melted) in the DSC was introduced into liquid nitrogen in a molten state to prepare a quench-cooled amorphous sample, and the amorphous sample was heated at a heating rate of 10° C./min. A glass transition temperature was observed at 161° C. When the amorphous sample was further heated, an exothermic peak attributed to phase transition was observed at 250° C. This suggests that cold crystallization occurred. Next the amorphous sample was heated to 340° C. (completely melted) in the DSC and was cooled to room temperature at a cooling rate of 10° C./min to solidify the sample, and the solidified sample was heated at a heating rate of 10° C./min. A glass transition temperature was observed at 161° C. An exothermic peak attributed to cold crystallization was observed at 250° C. and an endothermic peak attributed to crystal melting was observed at 288° C. These peaks were observed at the same calorific value (absolute value).

The hydrogenated ring-opening polymer 3r was heated at 340° C. for 10 minutes (sufficiently melted), and melt-formed using the specific metal die. The melt-formed product was cooled to room temperature at a cooling rate of 10° C./min to solidify the melt-formed product to prepare a melt-formed sample. When the melt-formed sample was subjected to wide-angle X-ray diffraction analysis, a peak attributed to crystal diffraction was not observed, and only an amorphous halo was observed. Specifically, the degree of crystallinity (based on weight ratio) of the melt-formed sample was 0%.

When the melt-formed sample was subjected to DSC analysis, a glass transition temperature was observed at 161° C. during heating. A peak attributed to cold crystallization was observed at 250° C. and a peak attributed to crystal melting was observed at 288° C. These peaks were observed at the same calorific value (absolute value). It was thus confirmed that the atactic hydrogenated tetracyclododecene-based ring-opening polymer in which the ratio of meso diads was 60%, was not crystallized under the forming conditions in which the melt-formed product was cooled to room temperature at a cooling rate of 10° C./min using the specific metal die, and the melt-formed sample was amorphous. Therefore, the melt-formed sample did not have a melting point. The melt-formed sample was also subjected to the solder immersion test and the curling value measurement process. The results are shown in Table 1.

TABLE 1

|  | Example | | | Comparative Example | | |
| --- | --- | --- | --- | --- | --- | --- |
|  | 1 | 2 | 3 | 1 | 2 | 3 |
| Hydrogenated ring-opening polymer | 1 | 2 | 3 | 1r | 2r | 3r |
| Ratio of meso diads | 70% | 95% | 95% | 18% | 56% | 60% |
| Repeating unit derived from TCD | 100 | 69 | 92 | 100 | 100 | 100 |
| Repeating unit derived from DCP | — | 31 | — | — | — | — |
| Repeating unit derived from NB | — | — | 8 | — | — | — |
| Glass transition temperature (° C.) (due to rapid cooling) | 166 | 142 | 141 | 162 | 161 | 161 |
| Melting point (° C.) (after melting) | 312 | 342 | 335 | Not observed | 289 | 288 |
| Degree of crystallinity (%) | 28 | 21 | 20 | 0 | 0 | 0 |
| Melting point (° C.) of formed article | 312 | 342 | 336 | — | — | — |
| Solder immersion test | Good | Good | Good | Bad | Bad | Bad |
| Curling value (mm) | 0 | 0 | 0 | Could not be measured | 21 | 25 |

As is clear from the results shown in Table 1, the hydrogenated tetracyclododecene-based ring-opening polymers of Examples 1 to 3 in which the ratio of meso diads was 65% or more, had a high melting point (after melting) and a high glass transition temperature, had a high crystallization rate (after melting), and exhibited excellent heat resistance (after melting).

The syndiotactic hydrogenated tetracyclododecene-based ring-opening polymer of Comparative Example 1 in which the ratio of meso diads was less than 65%, was substantially amorphous, and exhibited poor heat resistance (after melting). The atactic hydrogenated tetracyclododecene-based ring-opening polymers of Comparative Examples 2 and 3 did not exhibit crystallinity (after melting) when normal forming conditions were used (since the crystallization rate (after melting) was low), and exhibited poor heat resistance (after melting).

It was thus confirmed that the hydrogenated tetracyclododecene-based ring-opening polymer according to the embodiments of the invention has a high melting point (after melting) and a high glass transition temperature, has a high crystallization rate (after melting), and exhibits excellent heat resistance and excellent processability.

The invention claimed is:

1. A hydrogenated tetracyclododecene-based ring-opening polymer comprising a repeating unit (A) derived from tetracyclododecene having a content of endo-anti stereoisomer of 90% or more in a ratio of 40 wt % or more based on a total amount of repeating units, a ratio of meso diads in the repeating unit (A) being 65% or more,
   wherein the hydrogenated tetracyclododecene-based ring-opening polymer has a number average molecular weight (Mn) of 2,000 to 400,000, a melting point of 300° C. or more, and a glass transition temperature of 130° C. or more.

2. The hydrogenated tetracyclododecene-based ring-opening polymer according to claim 1, further comprising a repeating unit derived from dicyclopentadiene.

3. A method for producing a hydrogenated tetracyclododecene-based ring-opening polymer comprising a repeating unit (A) derived from tetracyclododecene in a ratio of 40 wt % or more based on a total amount of repeating units, a ratio of meso diads in the repeating unit (A) being 65% or more, the method comprising:
   subjecting a tetracyclododecene-based monomer comprising tetracyclododecene having a content of endo-anti stereoisomer of 90% or more in a ratio of 40 wt % or more based on a total amount of monomer to ring-opening polymerization using a compound represented by a formula (1) or a compound represented by a formula (2) as a polymerization catalyst to obtain a tetracyclododecene-based ring-opening polymer, and hydrogenating main-chain carbon-carbon double bonds of the tetracyclododecene-based ring-opening polymer using hydrogen and a hydrogenation catalyst, $$\left( \begin{array}{c} R^2 \\ R^3 \end{array} \begin{array}{c} R^1 \\ R^4 \end{array} \begin{array}{c} \\ R^5 \end{array} - O \right)_n \overset{L}{\underset{\|}{M}} - X_m \quad (1)$$

wherein M represents a transition metal atom that belongs to Group 6 in the periodic table, L represents an imido ligand that is unsubstituted, or substituted with an alkyl group having 1 to 12 carbon atoms or a substituted or unsubstituted aryl group having 6 to 12 carbon atoms, or an oxo ligand, each of $R^1$ to $R^5$ independently represents a hydrogen atom, an alkyl group having 1 to 12 carbon atoms, or a substituted or unsubstituted aryl group having 6 to 12 carbon atoms, provided that $R^1$ to $R^5$ are optionally bonded to each other to form a ring, X represents a halogen atom, n represents an integer from 1 to 4, and m represents (4-n),

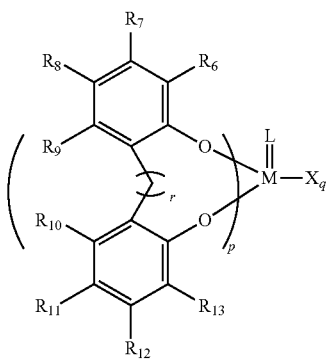

(2)

wherein M, L, and X are the same as defined above, each of $R^6$ to $R^{13}$ independently represents a hydrogen atom, an alkyl group having 1 to 12 carbon atoms, or a substituted or unsubstituted aryl group having 6 to 12 carbon atoms, provided that $R^6$ to $R^{13}$ are optionally bonded to each other to form a ring, p represents 1 or 2, q represents (4-2p), and r represents 0 or 1.

4. The hydrogenated tetracyclododecene-based ring-opening polymer according to claim 1, wherein the hydrogenated tetracyclododecene-based ring-opening polymer has crystallinity after being subjected to a thermal history including cooling due to melt forming.

5. The method for producing a hydrogenated tetracyclododecene-based ring-opening polymer according to claim 3, wherein the hydrogenated tetracyclododecene-based ring-opening polymer has crystallinity after being subjected to a thermal history including cooling due to melt forming.

6. The hydrogenated tetracyclododecene-based ring-opening polymer according to claim 1, further comprising a repeating unit derived from norbornene.

* * * * *